(12) United States Patent
Rudrabhatla et al.

(10) Patent No.: US 12,072,992 B2
(45) Date of Patent: Aug. 27, 2024

(54) DATA SECURITY CLASSIFICATION FOR STORAGE SYSTEMS USING SECURITY LEVEL DESCRIPTORS

(71) Applicant: EMC IP Holding Company LLC, Hopkinton, MA (US)

(72) Inventors: Anand Rudrabhatla, Pleasanton, CA (US); George Mathew, Belmont, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 302 days.

(21) Appl. No.: 17/377,859

(22) Filed: Jul. 16, 2021

(65) Prior Publication Data

US 2023/0018820 A1  Jan. 19, 2023

(51) Int. Cl.
   *G06F 21/62*  (2013.01)
   *G06F 12/14*  (2006.01)

(52) U.S. Cl.
   CPC ...... *G06F 21/6209* (2013.01); *G06F 12/1491* (2013.01); *G06F 2212/1052* (2013.01); *G06F 2221/2145* (2013.01)

(58) Field of Classification Search
   CPC ............. G06F 21/6209; G06F 12/1491; G06F 2212/1052; G06F 2221/2145; G06F 21/6218

See application file for complete search history.

(56) References Cited

U.S. PATENT DOCUMENTS

| | | | | |
|---|---|---|---|---|
| 9,189,329 | B1* | 11/2015 | Zhu | G06F 11/1048 |
| 2009/0083336 | A1* | 3/2009 | Srinivasan | G06F 11/1448 |
| 2016/0179421 | A1* | 6/2016 | Hwang | G06F 3/0685 |
| | | | | 711/162 |
| 2019/0114096 | A1* | 4/2019 | Trika | G06F 3/0619 |
| 2020/0082081 | A1* | 3/2020 | Sarin | H04W 12/08 |

* cited by examiner

*Primary Examiner* — Mohammad W Reza
(74) *Attorney, Agent, or Firm* — Staniford Tomita LLP

(57) ABSTRACT

A security level tagging process to enable a user to associate a security level descriptor with a file, or a namespace directory where files and subdirectories inherit the security level descriptor from a parent directory. A parser can be used to automatically set a security level descriptor based on the contents of the file and/or attributes of files, or an administrator can associate a security level to a storage tier in the file system so that files are placed on the storage tiers with the matching security level as the file security level descriptor. The placement of the file on a storage tier depends on the data security level descriptor of the file and the security level of the storage so that files are placed on tiers where security level associated with the tier is greater than or equal to data security level of the file. Files can be migrated among storage tiers as their security levels may change.

19 Claims, 8 Drawing Sheets

DATA SECURITY CLASSIFICATION FOR STORAGE SYSTEMS USING SECURITY LEVEL DESCRIPTORS

TECHNICAL FIELD

Embodiments are generally directed to data storage and security, and more specifically to providing data security classification using data security level descriptors for files.

BACKGROUND

Data protection comprising backup and recovery software products are crucial for enterprise-level network clients. Customers rely on backup systems to efficiently back up and recover data in the event of user error, data loss, system outages, hardware failure, or other catastrophic events to allow business applications to remain in service or quickly come back up to service after a failure condition or an outage.

As companies look to unlock the value of their data to drive business outcomes, they are facing increasing challenges in keeping that data secure in the face of growing threats, such as hacks, security breaches, ransomware attacks, and the like. Depending on the industry vertical and geographic location they operate in, there are also certain compliance and regulatory obligations put on these companies. To mitigate the risk to their data from the ransomware and security breaches, and to meet such compliance and regulatory obligations, data storage customers (users) are looking for enhanced governance controls on how their data is stored and protected. In this context, these users have become increasingly interested in understanding the contents of their secondary copies, as they look to mine additional knowledge from such data for making informed decisions on securing the data for protection storage. In many cases, the application developers and application owners may not have communicated the security profile for the application data to the IT team and in other cases, the IT team may be dealing with legacy data that has been around for several years, about which, very little is known within their organization. In both these cases, the IT team responsible for data protection has no apriori knowledge of the intended security profile for the data and how to handle the protection of such data from a security perspective.

This situation results in several issues for administrators, such as knowing if protection copies of data has sensitive and/or personal identification information (PII), such as passport number, citizenship number, medical record number, salary, etc., or company information (e.g. financial and employee data) so that they are able to make informed decisions as to where to store that data (e.g., self-encrypted drives, storage on public cloud, in specific regions, federal protected cloud, etc.). Likewise, this knowledge is needed to determine whether the data can be restored on demand by anybody in the organization or by a limited few and in what situations (e.g., requires signoff by a security officer), or whether the copy is at high risk for ransomware to determine whether or not it should be encrypted for security, and if so, how stringently (e.g. embedded key based versus KMIP with rotation).

Administrators also need to know how to proactively provide security information for the protected copies as input for the governance and compliance reports based on factors such as: data crossing geographical or regional boundaries, copies past expiration and that have not been deleted, copies that do not have the right retention periods, data-driven decision making (e.g., store data protection copies in Azure but not Google as they do not meet corporate policies), and so on. Other important decisions for an application administrator are: deciding which storage tier to protect the copies based on security profile for cost optimization while meeting service level agreement (SLA) requirements, and knowing the data security profile apriori for proactive data management of the protection copies (e.g., which copies require Cyber Recovery Services for business continuity, and which do not).

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. DellEMC, NetWorker, Data Domain, Data Domain Restorer, and PowerProtect Data Manager (PPDM) are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
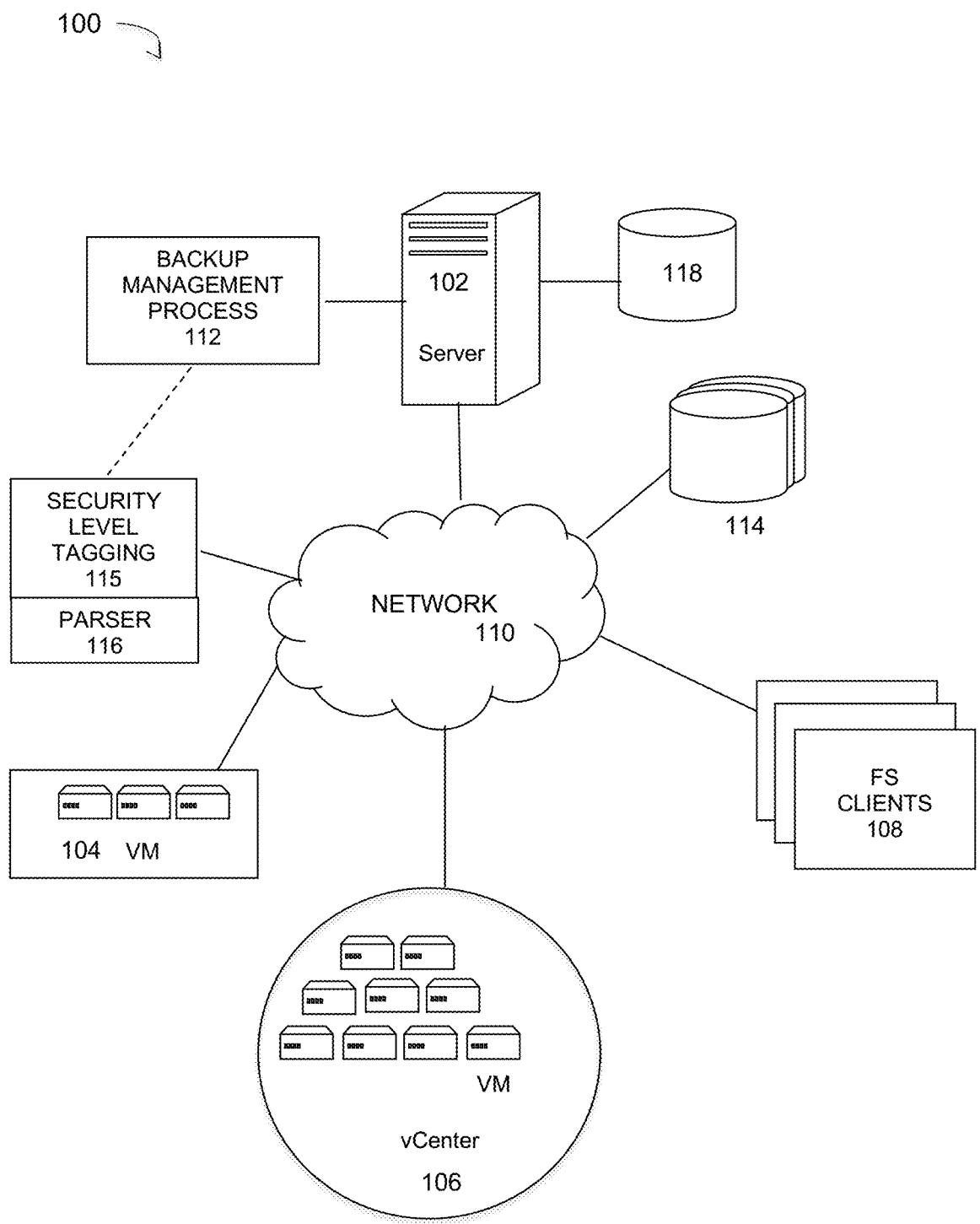
FIG. 1 is a diagram of a large-scale data backup system implementing a security level tagging process, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. The computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve automated backup techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

A network server computer 102 is coupled directly or indirectly to the target VMs 106, and to the data sources 108 and 109 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud-computing platform.

The data sourced by system 100 may be stored in any number of other storage locations and devices, such as local client storage, server storage (e.g., 118), or network storage (e.g., 114), which may at least be partially implemented through storage device arrays, such as RAID components. In an embodiment, network storage 114 and even server storage 118 may be embodied as iSCSI (or similar) disks that provide dynamic disk storage. In an embodiment, the storage devices 114 represent NAS devices or appliances, but other types of storage architectures may also be used, such as storage area network (SAN) or any other protocol that makes use of large-scale network accessible storage devices 114, such as large capacity disk (optical or magnetic) arrays.

FIG. 1 illustrates a computer network system 100 that implements one or more embodiments of a security level tagging for data storage environments, under some embodiments. System 100 represents a network backup and storage system that can backup data from one or more data sources to one or more different storage media domains, such as a physical disk storage domains and virtual hard disk (VHD) domains. Embodiments provide a way to place files are depending on their required data security level and the security level of the storage tier, such that files are always placed on tiers where security level associated with the tier is greater than or equal to data security level associated with the file.

Embodiments can be used in a physical storage environment, a virtual storage environment, or a mix of both, running a deduplicated backup program. In an embodiment, system 100 includes a number of virtual machines (VMs) or groups of VMs that are provided to serve as backup targets. Such target VMs may be organized into one or more vCenters (virtual centers) 106 representing a physical or virtual network of many virtual machines (VMs), such as on the order of thousands of VMs each. The VMs serve as target storage devices for data backed up from one or more data sources, such as file system (FS) clients 108. Other data sources having data to be protected and backed up may include other VMs 104 and data in network storage 114. The data sourced by the data source may be any appropriate type of data, such as database data that is part of a database management system. In this case, the data may reside on one or more storage devices of the system, and may be stored in the database in a variety of formats.

For the embodiment of FIG. 1, network system 100 includes a server 102 that functions as a backup server by executing a backup management process 112 that automates the backup of network data using the target VM devices or the network storage devices 114. In an embodiment, the backup process 112 uses certain known full and incremental (or differencing) backup techniques along with a snapshot backup process that is used to store an image or images of the system(s) to be backed up prior to the full or incremental backup operations.

In an embodiment, the network system of FIG. 1 may be implemented as a DellEMC PowerProtect Data Manager (or similar) data protection system. This is an enterprise-level data protection software platform that automates data backups to tape, disk, and flash-based storage media across physical and virtual environments. A number of different operating systems (e.g., Windows, MacOS, Linux, etc.) are supported through cross-platform supports. Deduplication of backup data is provided by integration with systems such as DellEMC Data Domain and other similar storage solutions. Thus, server 102 may be implemented as a DDR Deduplication Storage server provided by DellEMC Corporation. However, other similar backup and storage systems are also possible. In a general implementation, a number of different users (or subscribers) may use backup management process 112 to back up their data on a regular basis to virtual or physical storage media for purposes of data protection. The saved datasets can then be used in data restore operations to restore any data that may be lost or compromised due to system failure or attack.

In a data protection system, data from the primary storage of data sources and clients, such as their own resident disks or tenant storage partitions is copied or moved to protection or secondary storage through data replication (copy) or migration (move) operations. Such operations are usually executed regularly as part of an overall data protection scheme, such as through regular deduplicated backups in accordance with defined backup policies that define which data is backed up how often and to which target storage devices, as well as any policies for restoring data from the protection storage back to clients in the event of recovery from a system failure.

In modern data processing systems, a great deal of care must be taken with respect to processing, accessing, moving, storing, and restoring critical and sensitive data, especially data that implicates corporate and government regulations with regard to data that is considered private, classified, privileged, and so on. In general, good data security practices requires users to transmit and stored such sensitive data to the same degree that it is protected in the client or primary storage device. That is, the target storage device should be as readily protected as the primary storage, and the transmission means should be robust and protected accordingly as well. Furthermore, as data ages or is kept for any significant amount of time, its security characteristics may change as well. For example, certain data may become more or less sensitive as time passes or certain events occur, and thus the security status of protected data is dynamic over time as well. This is especially true with respect to legacy data (e.g., data over 10 years old) that may have been stored under a set of regulatory guidelines that may have changed or become outdated.

While a simple solution would involve protecting all data to the highest degree possible, such an approach is clearly impractical as high costs, retrieval latencies, and access restrictions are almost always imposed on securing stored data as tightly as possible. Tradeoffs must thus be struck between a storage policy that is too aggressive and results in high costs versus one that is too lax and is inexpensive but exposes data vulnerability with respect to service level objectives (SLOs).

As shown for system 100 of FIG. 1, embodiments include a security level tagging process 115 that processes a 'data security level descriptor' attribute for a file. The data security level descriptor for a file can be set either by the backup management process while the file is created or by a parser program 116 after the file is backed up. The security level tagging process 115 may be implemented as a network 110 or cloud-based process, or it may be associated with or integrated in the backup management process 112 or as a component within server 102, or any of the network clients. Likewise, the parser 116 can be a process or component provided with process 115 or as a separate network or server application.

The security level associated with a file generally dictates where it is copied or moved to in a replication or migration operation from a primary site (backup client) to protection storage so that the security level of the storage is appropriate for each file.

Figure 2:
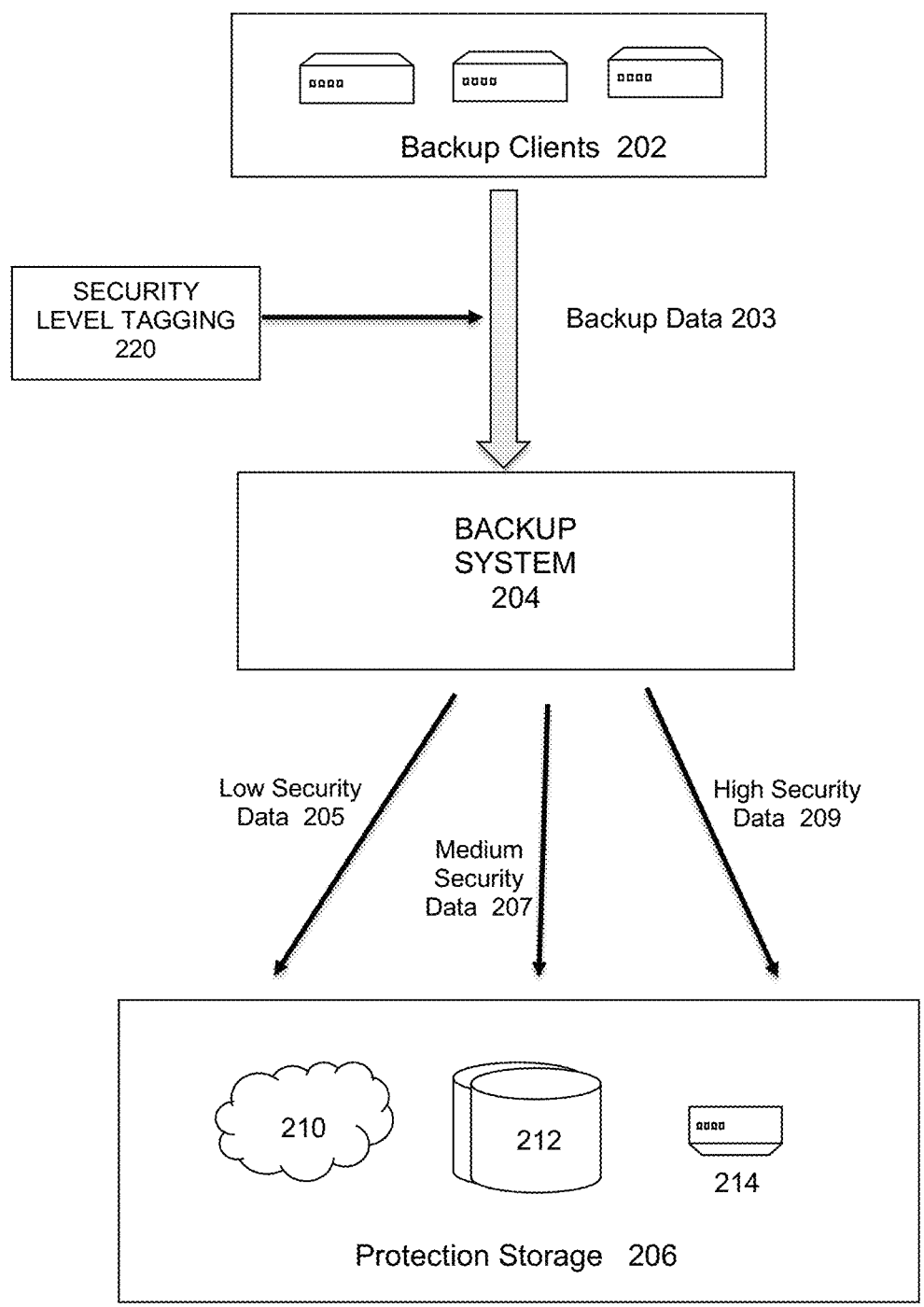
FIG. 2 is a block diagram that illustrates placement of data in a storage system based on security level tagging, under some embodiments.
Figure 3:
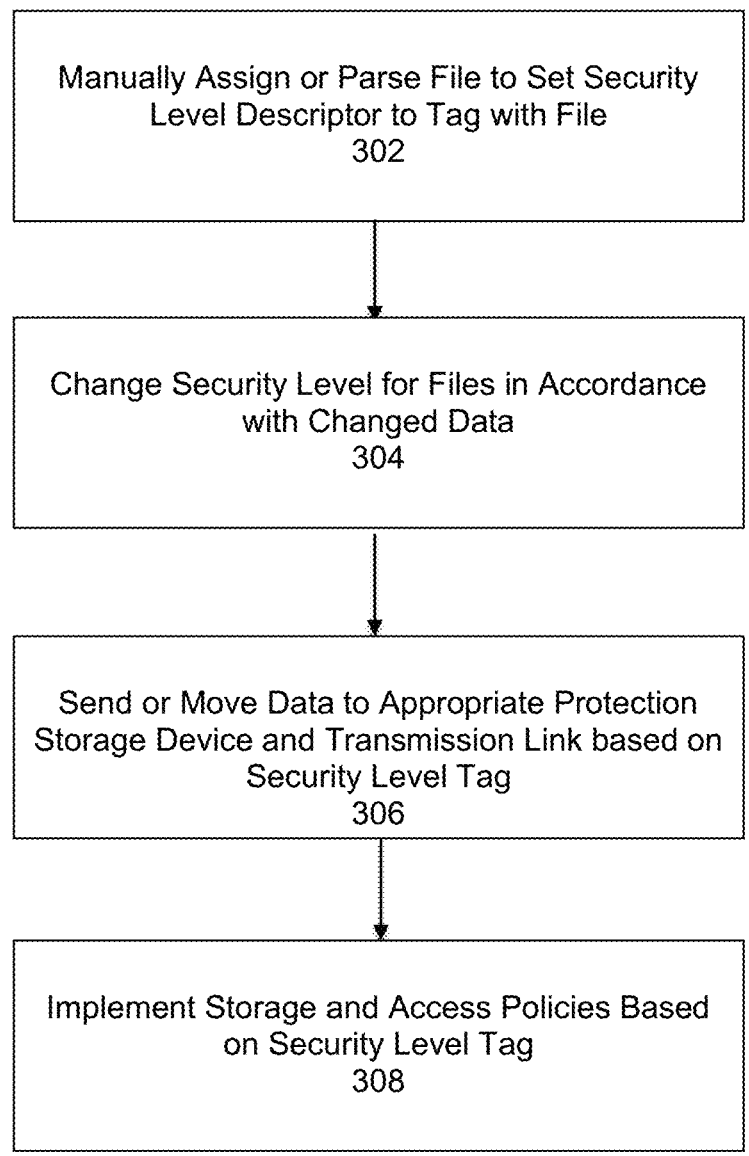
FIG. 3 is a flowchart that illustrates a method of implementing a security level tagging process, under some embodiments.

FIG. 2 is a block diagram that illustrates placement of data in a storage system based on security level tagging, under some embodiments. As shown in diagram 200, data to be backed up 203 is sourced by any number of backup clients 202. Such data comprises files sourced by the clients that are to be backed up or moved to protection storage 206 by backup system 204, such as a deduplicated backup server 102. The files from any or all of the clients may be classified in terms of their security status as high/low/medium, or any similar range or assignment of security. The three levels of security are provided for purposes of illustration and other ranges and characterizations may be used, such as quantitative rankings (first/second/third or A/B/C) or values along a range, such as a range of 1 to 3, 1 to 4 or 1 to 5, and so on.

Embodiments will be described to a three-level security range of high 209 for very private/confidential/sensitive data, medium 207 for somewhat private/confidential/sensitive data, and low 205 for not private/confidential/sensitive stored. It should be noted, however, that any other ranked range of security, as described above, may be used.

The security level is defined based on the need to keep the data secure with respect to privacy concerns and to limit access, restrict policies, and ensure data security when stored in protection storage 206. The security level is generally assigned by a creator, user or custodian of such data and may be assigned based on preference, inherent nature of the data, and/or policy dictates.

The protection storage 206 may comprise any combination of long-term storage devices, and in a large-scale enterprise system, different types of storage is often made available at different price points allowing users to optimize storage costs versus needs. For example, large amounts of public (cloud) storage 210 may be available as cheap storage for large amounts of data or for data that is to be stored for long periods of time without requirement for high security and limited access. Disk or array based storage on a more local scale, such as LAN or closely coupled storage may be provided 212 to allow users to implement higher security mechanism, and high security disks (e.g., self-encrypting drives) or solid state storage 214 may be provided as tightly coupled or highly controlled storage as the highest security level, and most expensive, storage option. The example protection storage devices 206 of FIG. 2 are provided for purposes of example only, and other devices and device types may be used to implement the protection-appropriate storage.

The number of different types of protection storage devices provided with respect to security levels should correspond to the number of security levels that are tagged to the backup data. Thus, if three security levels (e.g., high/medium/low) are used by tagging process 220, then at least three different protection level storage devices should be provided; and if four levels are defined, then four types of protection storage devices should be provided, and so on.

In an embodiment, the files comprising the backup data 203 for each client are classified based on their desired or required security level by the security level tagging process 220. Depending on the classification of the backup data from the clients, the backup system will send the source data to the appropriate storage device 206. The security level tagging system will tag each file as high, medium, or low security (or any other value along a range of hierarchical security levels), and the backup system will direct each of those files to the appropriate storage device 206 based on the security capability of that device. Each client may generate only one type of security level data, such as only low security data, however in a typical system, each client generates files of different security levels. Within a file, data of the highest security level dictates the maximum security level of the entire file. Thus a file with both public data and highly sensitive data will be treated as a high security file.

Besides protection storage device type, the tagged security level may also be used to determine other transmission processes for the backup data. For example, certain encryption processes may be implemented for high and medium security data versus low security data. Also, such data may be configured to be sent only by secure data links rather than public transmission lines. Geographic and temporal restrictions may be set for such data as well. For example, cross-border migration of data may be allowed or restricted based on the security level of the data, or storage periods may be restricted or relaxed based on security levels. Likewise access and revision capabilities may be defined for users or classes of users based on the tagged security levels. Such processing restrictions may be defined or encapsulated by policies or scripts triggered by the tagged security level, and may be implemented by the backup system 204 or by the backup clients when data is restored from the protection storage.

FIG. 2 is a flowchart that illustrates a method of implementing a security level tagging process, under some embodiments. Using process 115, when file is created, a security level descriptor is associated with (tagged on) the file at the creation time. Alternatively, once a file is written, a parser 116 can examine the contents of the file to determine an appropriate security level descriptor for tagging to the file. The assigned or parsed security level descriptor indicates that the file contains certain data that is defined or deemed to be or restrictive, confidential, sensitive, protected and so on under certain internal or external policies, corporate/governmental requirements, industry guidelines, contractual obligations, and so on. Examples of such data include PII data (passport, driver's license, social security numbers, etc.) medical data, financial data (wage information, bills, bank account information, etc.), company trade secrets, governmental agency information, data subject to legal holds, and many other similar types of data. As shown in FIG. 2, process 200 starts with tagging the file with the appropriate security level descriptor with the file through either a manual assignment or parser process that determines the appropriate security level of the file.

In some cases, a file may have data that is added or changed to a different security level. In this case, the security level descriptor is changed to the higher or lower security level, 304. If multiple storage levels or tiers are present, different security levels can be assigned accordingly, and files are placed depending on their data security level descriptor and the security level of the storage tier, such that files are always placed on tiers where security level associated with the tier is greater than or equal to data security level associated with the file.

Upon initiation of a backup operation that copies or moves the data to protection storage, the file is sent to the appropriate storage device and over the appropriate transmission link based on its assigned security level descriptor, 306.

Any storage policies (e.g., retention periods, etc.), downstream movement (e.g., between data centers, across borders, to other regions, etc.), and access restrictions are then enforced on the stored file while it is stored based on the security level descriptor, 308. Any processes related to data restoration of the file back from protection storage to the original client can also be applied based on the security level descriptor.

In an embodiment, the security level descriptor is attached or associated with a file in the form of an extended attribute for the file, such as in a metadata definition. Such a descriptor may be implemented as a metadata key structure, such as follows:

key:nn_DDSecurity_[values], where nn is 01 for high, 02 for medium, or 03 to low security tiers. This is just one example of a security level descriptor metadata element, and any other similar structure may be used. Such a descriptor would need to, at a minimum, attach a hierarchical security level (e.g., 1-3, 1-4, etc.) to a file that dictates where the backup process sends the file during a replication or move operation with respect to the target storage device.

In an embodiment, the backup process maintains an assignment table or similar structure that assigns specific data storage targets or target types to the defined security levels. Table 1 below illustrates an example target storage assignment for different security levels, under some embodiments.

TABLE 1

| Data Security Level | Target Storage Device |
|---|---|
| 1 | Self-Encrypted Secure HDD/SSD Storage |
| 2 | Secure Cloud Storage (e.g., meeting state and/or federal security standards) |
| 3 | Non-Secure SAN Storage |

Table 1 is provided for purposes of illustration only, and other security levels and storage device assignments are also possible.

In an embodiment, files are assigned specific security levels by users (creators, administrators, etc.) of the file upon creation, modification or other processing of a file. A file system can also have an inheritable security level descriptor associated with a namespace or a directory containing files. Any files created in the namespace/directory will inherit the security level descriptor associated with the file, unless explicitly modified otherwise.

As stated above, if multiple storage tiers are present in a file system, the file system administrator can assign a security level to each storage tier. The placement of the file on a tier would depend on the data security level descriptor of the file and the security level associated with the storage such that files are always placed on tiers where security level associated with the tier is greater than or equal to data security level associated with the file.

The security level descriptor will be used by the file system for the placement of the file in a multi-tiered storage system. The security descriptor can either be explicitly and apriori set by user/administrator, or alternatively, by the system itself using data sensitivity parsers and training data that can either recommend the setting to the user for them to set, or automatically tag the data accordingly. Under embodiments, a security level descriptor can be attached to a file in one of at least four ways: first through inheritance from a namespace or directory, second by a user directly upon file creation, third by a parser examining the file contents and assigning a security descriptor, and fourth by a change to an existing descriptor by the parser or the user. FIGS. 4 to 7 illustrate each of these processes of how files are mapped to storage tiers based on the security level descriptors for files and the security levels for storage tiers.

A file system can span multiple tiers of secure storage, e.g., self-encrypted drives, storage on public cloud, storage in a specific region, cloud storage meeting state and federal security requirements, and so on. Each storage tier can be associated with a security level. If a security level descriptor is set on a file at the creation time of the file, that file will be placed on a storage tier with a security level that matches the security descriptor on the file. If a file was written and later the security descriptor assigned to the file changes, a file migration could move the file to the correct storage tier. Similarly if a tiering policy is set on a file, the file could be tiered to a storage tier that matches the security level descriptor of the file. Once the security attribute is set on the file, the user can define rules dictating how the data needs to be moved such as: (1) don't move to public cloud X; (2) don't move outside the corporate boundaries; (3) encrypt with key "y" before moving to public cloud X; (4) migrate only to encryption enabled storage tier, and other similar rules.

In an embodiment, the security level tagging process 220 works in a Data Domain or similar data protection system that comprises a domain namespace and files organized as manageable file sets called an MTree. These are practically standalone filesystems in their own right inside a larger filesystem that encloses them. As many as 256 separate Mtrees can exist in a given instance of DDFS. An MTree is a set of files in a self-contained file set and each Mtree acts as a mount point. Mtrees are represented internally as B+Trees with a number of intermediate levels. A B+Tree is a balanced tree of fixed depth and each node is a fixed sized page of 64 KB. The actual file metadata (traditional inode), is contained in the B+Tree Leaf page. The leaf page itself contains key/value pairs, where the key is a 128-bit number kept in sorted order in the page, and the value is an index to data associated with that key. When a directory and its files are created in sequence the keys for those entities line up sequentially in the Mtree Leaf Page. This means that the lookup proceeds expeditiously since all the data is already in memory.

Figure 4:
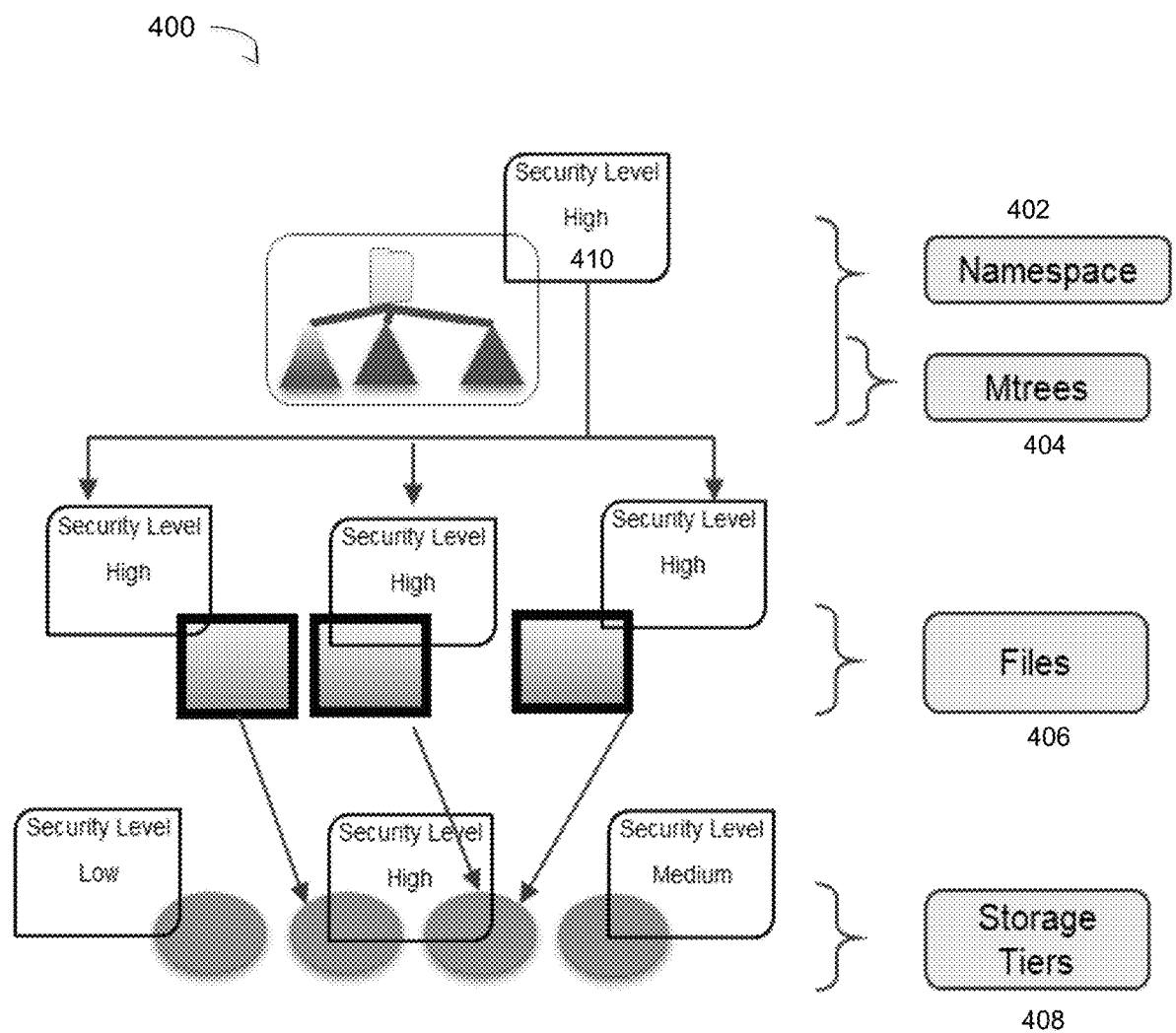
FIG. 4 illustrates an embodiment of the security level tagging process where the security descriptor is inherited from the namespace or directory.

In an Mtree-based system, certain attributes by higher level directories and files are automatically passed down to lower level files. FIG. 4 illustrates an embodiment of the security level tagging process where the security descriptor is inherited from the namespace or directory. In this embodiment 400, the files 406 are maintained by Mtrees 404 in namespace 402. These files are stored by the backup process in storage tiers 408, which comprise low, high, and medium level security storage devices, as shown. The security level descriptor 410 for the namespace is set, in this case to 'high.' This security level is then associated with all of the files 406 in the Mtrees 404 through the appropriate security level descriptor tag. That is, the security level descriptor tag is automatically likewise set to 'high' for each of these files, and accordingly, these files are saved to the high security level storage tier, as shown. The files are always placed on storage devices or tiers where the security level associated with the tier is greater than or equal to the data security level associated with the file.

Figure 5:
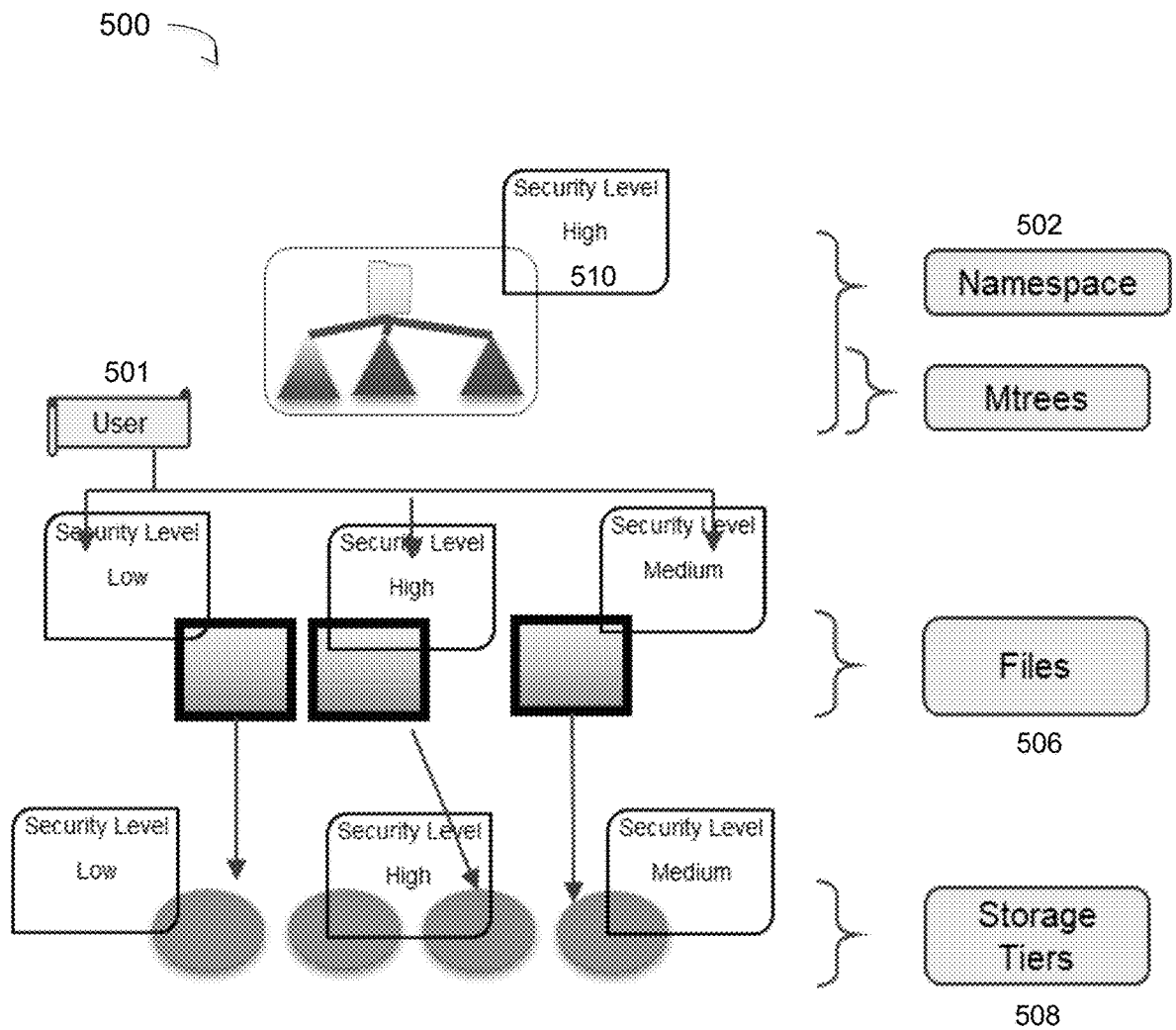
FIG. 5 illustrates an embodiment of the security level tagging process where the security descriptor is associated with a file upon file creation by the user.

FIG. 5 illustrates an embodiment of the security level tagging process where the security descriptor is associated with a file upon file creation by the user. In this embodiment 500, the security level descriptor for the namespace 502 is defined as 'high,' but the user 501 manually assigned the files 506 different security levels of low, medium, and high. These files as tagged by the user are then sent to the appropriate low/medium/high storage tiers 508, as shown. The security level descriptor 410 for the namespace is set, in this case to 'high.' As above, the files are always placed on storage devices or tiers where the security level associated with the tier is greater than or equal to the data security level associated with the file.

Figure 6:
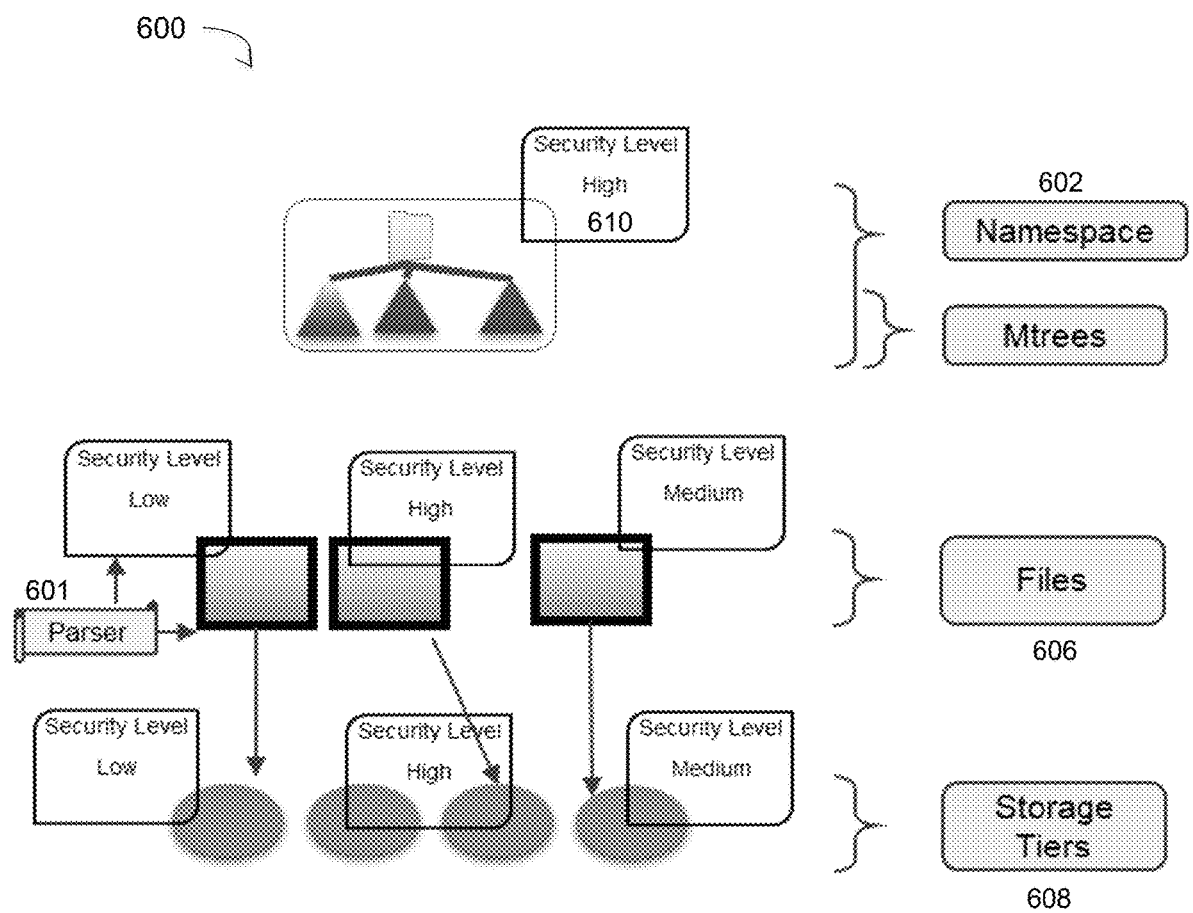
FIG. 6 illustrates an embodiment of the security level tagging process where the security descriptor is associated with a file by a parser.

FIG. 6 illustrates an embodiment of the security level tagging process where the security descriptor is associated with a file by a parser. In this embodiment 600, the security level descriptor for the namespace 602 is defined as 'high,' but a parser process 601 examines the contents of each file and manually assigns the files 606 different security levels of low, medium, and high based on their respective contents. These files as tagged by the parser are then sent to the appropriate low/medium/high storage tiers 608, as shown. The security level descriptor 410 for the namespace is set, in this case to 'high.' As above, the files are always placed on storage devices or tiers where the security level associated with the tier is greater than or equal to the data security level associated with the file.

In the case of the parser embodiment 600, the data sensitivity parser needs a dictionary to set the security level attribute on a file (e.g., low, medium, high). For this embodiment, the parser examines the files and recognizes certain keywords or phrases that identify or indicate security requirements, such as PII numbers (e.g., xxx-xx-xxxx for social security numbers, (xxx) xxx-xxxx for phone numbers, etc.) or numbers that are identified as bank routing/account numbers, and so on. The format and contents of any sensitive information can be defined by the system and provided to the parser, such as code words for projects or activities, or the system can learn such categories based on training data, machine learning tools, and the like. In both the user-set or parser-set security descriptor cases, the system uses the security level descriptor for the file to figure out where to store the data, and what additional audits and metadata has to be collected for feeding into the compliance and governance systems. For example, the security level descriptor can also be associated with a set of role-based access control (RBAC) rules to limit access that is aligned with the data sensitivity.

Figure 7:
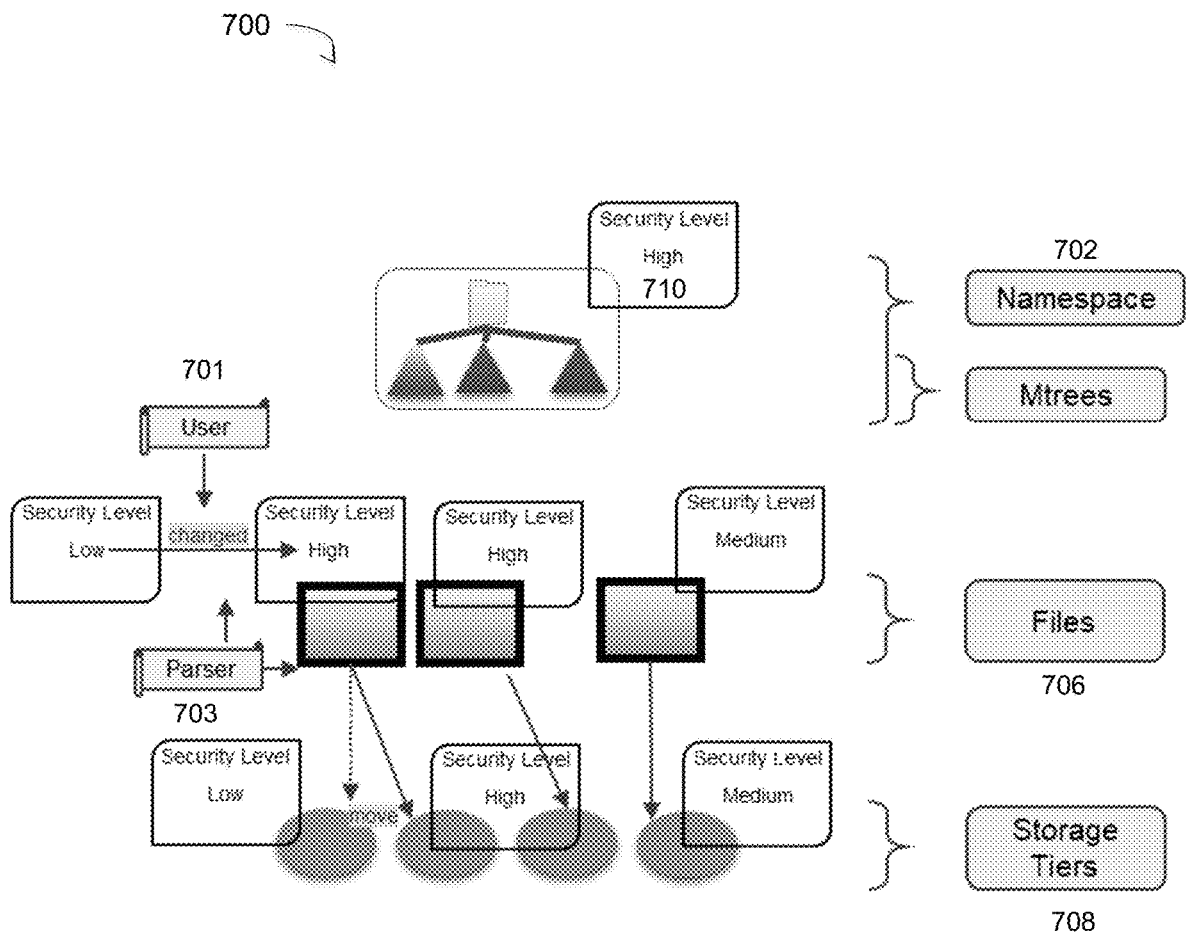
FIG. 7 illustrates an embodiment of the security level tagging process where the security descriptor associated with a file is changed by a user or parser.

The embodiments of FIGS. 4 to 6 illustrate cases where the files are initially tagged with inherited or user/parser assigned security level descriptors. In some cases, a previously tagged file may be updated or changed with a new security level descriptor. Such a change may be triggered by the user or a parser, as in the direct set embodiments. FIG. 7 illustrates an embodiment of the security level tagging process where the security descriptor associated with a file is changed by a user or parser. In this embodiment 700, the security level descriptor for the namespace 702 is defined as 'high,' but a number of files 706 are tagged with low, medium, or high security level descriptors. For the example shown, a user 701 or parser 703 changes an originally low security level file to become a high security level. This in turn causes the file to be moved from a low security storage tier 708 to a high security storage tier, as shown.

Embodiments of a security level tagging process thus enable a user to associate a security level descriptor with a file, or a namespace directory where files and subdirectories inherit the security level descriptor from a parent directory. A parser can be used to automatically set a security level descriptor based on the contents of the file and/or attributes of files. It also provides the ability for a file system administrator to associate a security level to a storage tier in the file system so that files will be sent to storage tiers with the matching security level as the file security level descriptor. Files can be migrated among storage tiers as their security levels may change after creation.

Using these constructs, a security level descriptor can be set on a file either by explicit definition, inheritance from a parent namespace, or automatically set on the file by a parser. The placement of the file data will be restricted to a storage tier where the security level for the tier is equal to or greater than the security level descriptor of the file. If the security level descriptor is changed on an existing file, a file migration workflow will be triggered to move the file to the correct storage tier.

As described above, in an embodiment, system 100 processes that may be implemented as a computer implemented software process, or as a hardware component, or both. As such, it may be an executable module executed by the one or more computers in the network, or it may be embodied as a hardware component or circuit provided in the system. The network environment of FIG. 1 may comprise any number of individual client-server networks coupled over the Internet or similar large-scale network or portion thereof. Each node in the network(s) comprises a computing device capable of executing software code to perform the processing steps described herein.

Figure 8:
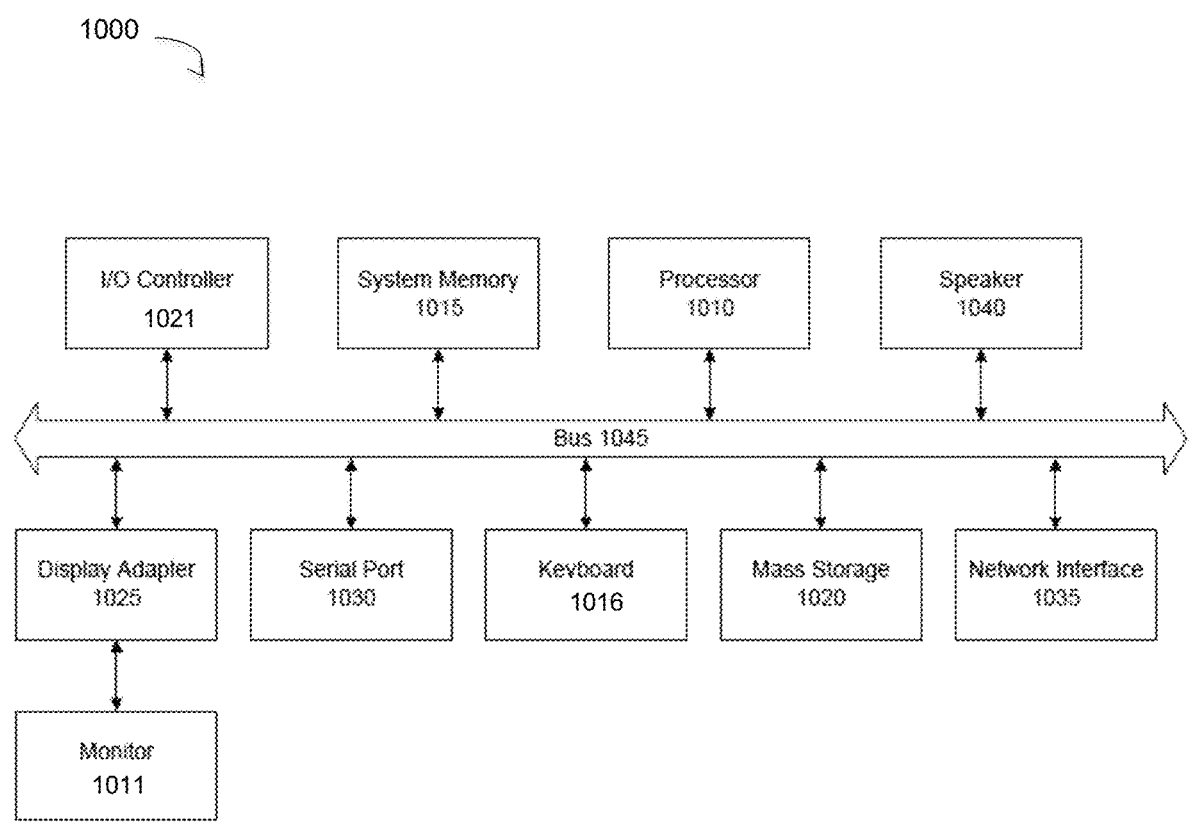
FIG. 8 is a block diagram of a computer system used to execute one or more software components of a system providing security classification, under some embodiments.

FIG. 8 is a block diagram of a computer system used to execute one or more software components of a system for performing some of the processor-based functions, under some embodiments. The computer system 1000 includes a monitor 1011, keyboard 1016, and mass storage devices 1022. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 is but one example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Although certain embodiments have been described and illustrated with respect to certain example network topographies and node names and configurations, it should be understood that embodiments are not so limited, and any practical network topography is possible, and node names and configurations may be used. Likewise, certain specific programming syntax and data structures are provided herein. Such examples are intended to be for illustration only, and embodiments are not so limited. Any appropriate alternative language or programming convention may be used by those of ordinary skill in the art to achieve the functionality described.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of storing data using a security classification, comprising:
examining a file through a parser examining key words of content in the file and using a dictionary to automatically set a security level attribute for the file based on a recognition of words indicating security requirements of the file;
tagging a security level descriptor corresponding to the security level attribute to the file through a security level tagging process, the security level descriptor indicating an amount of access restriction and protection based on a privacy need of content in the file, and provided to the file during storage in a storage device selected from among a plurality of storage devices, and wherein the security level descriptor is assigned to the file through a metadata definition as an extended attribute for the file, and that encodes at least one of a security level of file storage or a storage policy applied to the file;

organizing the plurality of storage devices into two or more tiers, each tier having a security level corresponding to its suitability to protect data of different privacy levels;

storing the file in a storage device of a tier having a security level corresponding to the security level descriptor of the file.

2. The method of claim 1 wherein the metadata definition comprises as a metadata key structure, wherein a key indicates a numerical security level.

3. The method of claim 2 wherein the numerical security level comprises a numeral from one to three indicating one of high security, medium security, and low security and indicates a corresponding security level assigned to a storage device of the plurality of storage devices.

4. The method of claim 1 wherein further comprising associating the security level descriptor to a namespace directory containing the file.

5. The method of claim 4 wherein the file inherits the security level descriptor from the namespace directory through a feature of a modified B+ tree structure organizing the files of the namespace directory.

6. The method of claim 1 wherein the security level descriptor is directly assigned to the file by a user.

7. The method of claim 1 wherein the security level descriptor is automatically assigned to the file based on a parser process analyzing contents or attributes of the file.

8. The method of claim 7 wherein the contents and attributes are determined using a keyword process identifying defined terms using training data.

9. The method of claim 1 further comprising:
determining if an initial security level of a file having an assigned security level descriptor has changed;
updating, if so, the assigned security level descriptor to a new security level descriptor; and
moving the file from a first storage device corresponding to the initial security level descriptor to a second storage device corresponding to the new security level descriptor.

10. The method of claim 1 wherein the plurality of storage devices comprises storage tiers including self-encrypted hard disk drives, public cloud storage, region-specific storage, and federal protected cloud storage, each providing a different level of protection for stored files.

11. The method of claim 10 further comprising providing the user the ability to define rules dictating how the file is moved among the storage tiers based on the security level descriptor.

12. A computer-implemented method of storing data using a security classification, comprising:
examining a file through a parser examining key words of content in the file and using a dictionary to automatically set a security level attribute for the file based on a recognition of words indicating security requirements of the file;
assigning, through a security level tagging process, a directory first security level descriptor corresponding to the security level attribute to a namespace holding the file, wherein the security level descriptor is assigned to the file through a metadata definition as an extended attribute for the file, and that encodes at least one of a security level of file storage or a storage policy applied to the file;

organizing the plurality of storage devices into two or more tiers, each tier having a security level corresponding to its suitability to protect data of different privacy levels;

associating a file security level descriptor indicating an amount of access restriction and protection based on a privacy need of content in the file with the to a file by one of: inheritance of the directory security level descriptor by the file, direct assignment of the file security level descriptor to the file by a user, and automatic assignment of the file security level descriptor to the file by the parser process based on a content or and the security level attribute of the file; and storing the file in a storage device of a tier having a security level corresponding to the file security level descriptor.

13. The method of claim 12 wherein the wherein the inheritance comprises the file inheriting the security level descriptor from the namespace directory through a feature of a modified B+ tree structure organizing the files of the namespace directory.

14. The method of claim 13 wherein the file security level descriptor is represented as a numerical security level indicating a relative value along a range of low security to high security with one or more intermediate security levels, and indicates a corresponding security level assigned to a storage device of the plurality of storage devices.

15. The method of claim 12 further comprising:
determining if an initial security level of a file having an assigned security level descriptor has changed;
updating, if so, the assigned security level descriptor to a new security level descriptor; and
moving the file from a first storage device corresponding to the initial security level descriptor to a second storage device corresponding to the new security level descriptor.

16. The method of claim 15 further comprising providing the user the ability to define rules dictating how the file is moved among the storage tiers based on the security level descriptor.

17. A system for storing data using a security classification, comprising:
a parser component examining a file by examining key words of content in the file and using a dictionary to automatically set a security level attribute for the file based on a recognition of words indicating security requirements of the file;
a backup server moving backup data from one or more clients to backup storage comprising a plurality of different type protection storage devices, the storage devices organized into two or more tiers, each tier having a security level corresponding to its suitability to protect data of different privacy levels;
a security level tagging component assigning a directory first security level descriptor to a namespace holding a plurality of files, wherein the directory first security level descriptor indicates an amount of access restriction and protection based on a privacy need of content in the file, and is assigned to the file through a metadata definition as an extended attribute for a file, and that encodes at least one of a security level of file storage or a storage policy applied to the file, the security level tagging component further associating a file security level descriptor to a file by one of: inheritance of the directory security level descriptor by the file, direct assignment of the file security level descriptor to the file by a user, and automatic assignment of the file security level descriptor to the file by a parser process based on a content or attribute of the file; and a transmission network storing the file in a storage device of a tier having a security level corresponding to the file security level descriptor.

18. The system of claim 17 wherein the inheritance comprises the file inheriting the security level descriptor from the namespace directory through a feature of a modified B+ tree structure organizing the files of the namespace directory, and further wherein the file security level descriptor is represented as a numerical security level indicating a relative value along a range of low security to high security with one or more intermediate security levels.

19. The system of claim 18 wherein the security level tagging component further determines if an initial security level of a file having an assigned security level descriptor has changed, and if so, updates the assigned security level descriptor to a new security level descriptor, and moves the file from a first storage device corresponding to the initial security level descriptor to a second storage device corresponding to the new security level descriptor.

* * * * *